L. E. EVSLIN.
ARTIFICIAL TOOTH.
APPLICATION FILED OCT. 21, 1910.
1,238,397.
Patented Aug. 28, 1917.
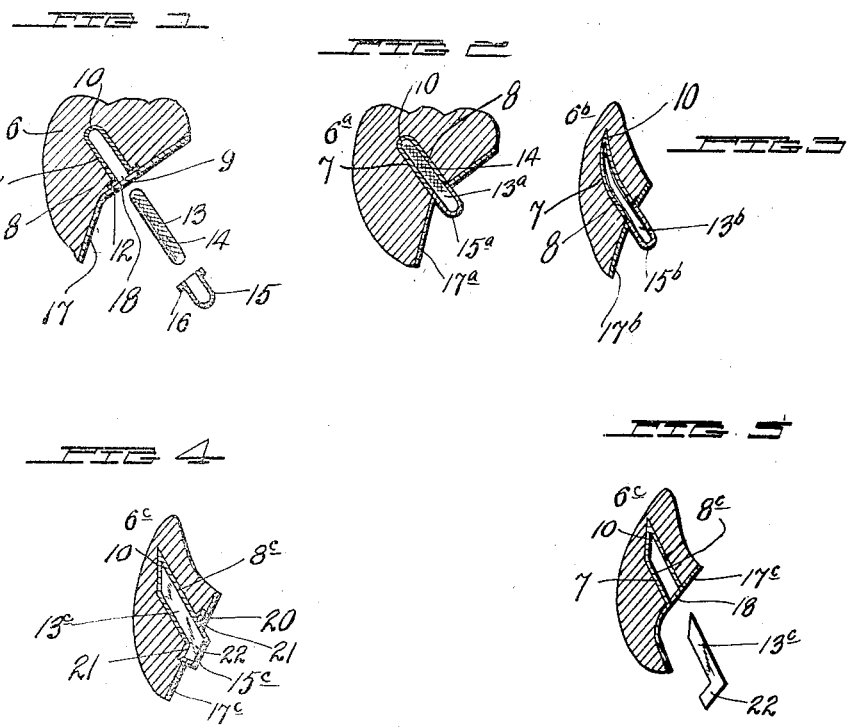
Witnesses
Robert Plows
[signature]
Inventor
Leo E. Evslin
By Chas. A. LaPorte
Atty

UNITED STATES PATENT OFFICE.

LEO E. EVSLIN, OF NEW YORK, N. Y., ASSIGNOR, BY MESNE ASSIGNMENTS, TO DORA STALBERG, OF PHILADELPHIA, PENNSYLVANIA.

ARTIFICIAL TOOTH.

1,238,397. Specification of Letters Patent. Patented Aug. 28, 1917.

Application filed October 21, 1910. Serial No. 588,379.

*To all whom it may concern:*

Be it known that I, LEO E. EVSLIN, a subject of the Emperor of Russia, residing at New York, in the county of New York and State of New York, have invented certain new and useful Improvements in Artificial Teeth, of which the following is a specification.

This invention has reference to improvements in artificial teeth wherein is employed a pin and metallic backing for the tooth and wherein it is intended that the pin and backing shall be interchangeable with teeth of the same kind.

The invention has for its principal object to provide a metallic boxing or socket for the reception of the pin in the tooth, said boxing or socket being preferably closed at its inner end; a box-envelop for the protruding end of the pin at the back of the tooth, and a metallic backing, the envelop and backing when assembled on the tooth and the backing shaped to the tooth being easily removed in assembled relation, whereby the soldering together of the backing and envelop is greatly facilitated.

Figure 1 shows in section a bicuspid provided with a metallic boxing or socket to receive a round pin, the pin and box-envelop being removed from the tooth and the backing lying against and conforming to the back of the tooth;

Fig. 2 shows in section a tooth similar to Fig. 1 and also showing a modified form of envelop for the pin, the pin, envelop and backing in place;

Fig. 3 shows a section of a front tooth with a porcelain bite. In this tooth the socket is formed to adapt itself to the best advantage under the porcelain bite, it therefore takes a curved direction in the interior of the tooth. The envelop is similar to that shown in Fig. 2;

Fig. 4 shows in section a front tooth with a porcelain bite, showing a modified form of pin, envelop and having a modified back; and Fig. 5 shows in section a front tooth similar to Fig. 4, except it has a modified back and the pin is removed.

Reference being had to Fig. 1, 6 designates an artificial body preferably formed with a socket 7 extending inwardly into the tooth from the back, at a point approximately the center of the back and terminating in the vicinity of the buccal-cusp. Baked in the tooth and in the socket 6 thereof is a metallic-boxing or socket 8, which may be either round or square, said boxing or socket opening out of the back of the tooth, as at 9, and having its inner end closed at 10. When casting the tooth, the boxing or socket is built to adapt itself in the interior of the tooth, so that its closed end 10 is in the vicinity of the buccal-cusp. The back of the tooth adjacent the open end of the socket 8 is preferably formed or cast with the depression or seat 12.

The pin is designated 13 and may be round or square, and if round, the greater portion of its body is milled, as at 14 to facilitate in firmly cementing the pin in the metallic-boxing or socket 8 in the tooth. The pin is longer than the socket in the tooth, so that it will protrude or extend a predetermined distance from the rear face of the tooth, for purposes which I will now explain: Adapted to fit over and cover the protruding end of pin 13 is what I term a "box-envelop 15". This envelop 15 is a tubular or rather dome-shaped body, open at one end and closed at its other end, and around the open end of said envelop is provided radial wings or a flange 16, which, when the envelop has been placed over the protruding end of the pin, will be seated in the depression or seat 12 in the back of the tooth, which leaves the outside face of the wings or flange 16 flush with the back of the tooth. Over the envelop is placed the backing 17, said backing having an opening 18, conforming to the shape of envelop to be inserted therethrough, which permits the backing 17 to be placed in position on the back of the tooth and be shaped thereto, as shown.

In operation, after the pin has been inserted into the tooth and the box-envelop has been placed over the protruding end of the pin, the backing is placed over the envelop and burnished to back of tooth and against the wings or flange of the envelop, and is then waxed up with hard wax to box the envelop. The envelop and backing may then be removed, in assembled relation, from the pin and tooth, invested, wax removed, and box-envelop and backing soldered together. That portion of the pin fitting in the socket of the tooth may be either cemented in the tooth, or baked in the tooth while the tooth is in a plastic state.

Figs. 2 and 3 illustrate the application of the invention to pin teeth where an envelop is used which does not have the wings or flange. With this construction it matters little whether the envelop or backing is first applied, but when assembled and backing fitted to the tooth, the backing and envelop may be held together with wax, and the envelop serve as a means to be gripped by a pair of tweezers or other instrument for removing the envelop and backing as an entirety preparatory to finishing as described in Fig. 1. In Fig. 2 the tooth is designated 6ª, the pin 13ª, the envelop 15ª and the backing as 17ª. In Fig. 3 the tooth is designated 6ᵇ, the pin 13ᵇ, the envelop 15ᵇ and the backing as 17ᵇ. Attention is particularly called to the last mentioned figures, because the socket in its interior is formed to adapt itself to the best advantage under the porcelain bite; it therefore takes a curved direction in the interior of the tooth. The metallic socket should be slightly larger in diameter than the pin, to allow for the insertion of the pin.

Figs. 4 and 5 illustrate the application of the invention to teeth, here shown as front teeth with a porcelain bite, where the pins have angular portions over which the envelops fit, although in Fig. 5 the envelop has been omitted. The teeth are indicated as 6ᶜ, the metallic-boxing or sockets as 8ᶜ, the closed ends of which are preferably disposed at an acute angle and the rear face of the tooth, shown in Fig. 4, is provided with the grooves 20 to receive the flanges 21 of the box-envelop 15ᶜ. The backing is designated 17ᶜ. The pin 13ᶜ is preferably square and its protruding end is bent approximately at right angles toward the cervical-border of the tooth, as at 22. Over the bent portion 22 of the pin is adapted to be placed the envelop 15ᶜ with its flanges 21 seated in the grooves 20 or resting against the back of the tooth. Over the envelop fits the backing 17ᶜ.

It is obvious from the foregoing that the box-envelop may be used in various ways and that the same may be applied not only to the type of pin tooth shown in Fig. 1, but to ordinary pin teeth as well, so that it is made possible with the use of the envelop to make interchangeable teeth of any teeth.

What I claim is:

1. The mounting for a tooth having a socket and a recess at the opening of the socket, comprising a lining closed at its inner end, a pin conforming to said socket and lining and having an elongation protruding from the socket, a member to cover said elongation of the pin, said member being of substantially the same contour as the pin and closed at its outer end, and having a flange to enter the recess at the opening of the socket, and a backing plate having an opening to adapt it to be passed over the member.

2. The combination with a tooth having a socket formed therein, of a pin for engaging in said socket and having a portion of its length protruding out of said socket, an envelop for inclosing the protruding end of said pin having a lateral flange for engaging directly against portions of the tooth surrounding said socket, and a backing for the tooth having an aperture formed therethrough adapted to be inserted over the envelop so that portions of the backing surrounding the aperture may engage the lateral flange of the envelop, for the purpose set forth.

In testimony whereof I affix my signature, in presence of two witnesses.

LEO E. EVSLIN.

Witnesses:
  ROBERT PLOWE,
  CHAS. W. LA PORTE.